US009435948B2

(12) United States Patent
Leidy et al.

(10) Patent No.: US 9,435,948 B2
(45) Date of Patent: Sep. 6, 2016

(54) SILICON WAVEGUIDE STRUCTURE WITH ARBITRARY GEOMETRY ON BULK SILICON SUBSTRATE, RELATED SYSTEMS AND PROGRAM PRODUCTS

(71) Applicant: GLOBALFOUNDRIES INC., Grand Cayman (KY)

(72) Inventors: Robert K. Leidy, Burlington, VT (US); Mark D. Levy, Williston, VT (US); Qizhi Liu, Lexington, MA (US); Gary L. Milo, Milton, VT (US); Steven M. Shank, Jericho, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 22 days.

(21) Appl. No.: 14/304,318

(22) Filed: Jun. 13, 2014

(65) Prior Publication Data

US 2015/0363535 A1    Dec. 17, 2015

(51) Int. Cl.
| | |
|---|---|
| *G02B 6/12* | (2006.01) |
| *G02B 6/122* | (2006.01) |
| *G02B 6/125* | (2006.01) |
| *G02B 6/136* | (2006.01) |

(52) U.S. Cl.
CPC ............. *G02B 6/122* (2013.01); *G02B 6/125* (2013.01); *G02B 6/136* (2013.01); *G02B 2006/12061* (2013.01)

(58) Field of Classification Search
CPC .... G02B 6/136; G02B 6/132; G02B 6/1261; G02B 6/122; G02B 6/125; G02B 6/12; G02B 6/12038; G02B 6/12085
See application file for complete search history.

(56) References Cited

U.S. PATENT DOCUMENTS

| | | | | |
|---|---|---|---|---|
| 5,514,885 | A | * | 5/1996 | Myrick ................. G02B 6/122 257/216 |
| 2012/0155820 | A1 | | 6/2012 | Heck et al. |
| 2012/0288228 | A1 | | 11/2012 | Saito et al. |
| 2013/0039614 | A1 | | 2/2013 | Shubin et al. |
| 2013/0108211 | A1 | | 5/2013 | Kwok et al. |
| 2013/0170784 | A1 | | 7/2013 | Kim et al. |

FOREIGN PATENT DOCUMENTS

WO    WO2013095397    6/2013

OTHER PUBLICATIONS

"Hot Embossing of LCP Using Silicon Master Tool for Short Distance Optical Interconnects" K. Yadav, S.R. Kirkpatrick, A.Z. Siahmakoun 2007 SEM Annual Conference & Exposition on Experimental and Applied Mechanics—s08p02.

* cited by examiner

*Primary Examiner* — Thomas A Hollweg
*Assistant Examiner* — Mary A El Shammaa
(74) *Attorney, Agent, or Firm* — Michael LeStrange Hoffman Warnick LLC (57) ABSTRACT

Various embodiments include a silicon-based optical waveguide structure locally on a bulk silicon substrate, and systems and program products for forming such a structure by modifying an integrated circuit (IC) design structure. Embodiments include implementing processes of preparing manufacturing data for formation of the IC design structure in a computer-implemented IC formation system, wherein the preparing of the manufacturing data includes inserting instructions into the manufacturing data to convert an edge of the at least one shape from a <110> crystallographic direction to a <100> crystallographic direction.

19 Claims, 5 Drawing Sheets

SILICON WAVEGUIDE STRUCTURE WITH ARBITRARY GEOMETRY ON BULK SILICON SUBSTRATE, RELATED SYSTEMS AND PROGRAM PRODUCTS

BACKGROUND

The subject matter disclosed herein relates to integrated circuits. More particularly, the subject matter relates to design and fabrication of integrated circuit devices, and such devices.

As integrated circuit technologies have advanced, the size of these devices has correspondingly decreased. In particular, as devices are reduced in scale to comply with ever-smaller packaging, tighter constraints are applied to their dimensions and spacings.

As devices relying upon integrated circuits (ICs) have increased in complexity and functionality, those devices have required ever more dynamic ICs to meet the demands of those device users. For example, as mobile telephone technology has advanced, the size of the mobile phone has been significantly reduced while its functionality has significantly increased. These changes have required greater versatility from the ICs in mobile phones, as well as in other devices. In the case of the mobile phone, advances in these devices have required use of a single antenna as both a transmitter and receiver. The circuitry used in these antenna devices must therefore be able to switch very quickly in order to provide reliable performance.

Silicon-on-insulator (SOI) substrates have been used to build circuits capable of switching at these fast speeds. However, SOI substrates can be expensive to procure, making them less practicable for use.

SUMMARY

Various embodiments include systems, methods and computer-program products for forming silicon-based optical waveguide structures. Various particular embodiments include modifying a data-preparation process in forming a silicon-based optical waveguide structure in order to convert a directionality of the edges of the waveguide by approximately forty-five (45) degrees in order to enhance the efficiency of that waveguide.

A first aspect includes a silicon-based optical waveguide structure having: a bulk silicon substrate; a set of waveguide structures positioned within the bulk silicon substrate, wherein each of the set of waveguide structures includes: a silicon dioxide ($SiO_2$) layer filling a cavity within the bulk silicon substrate; an intermediate layer (e.g., silicon or silicon germanium (SiGe)) layer directly over the $SiO_2$ layer, the intermediate layer having a substantially flat lower surface contacting the $SiO_2$ layer; and a silicon layer overlying the intermediate layer, wherein the $SiO_2$ layer extends above the intermediate layer through the silicon layer.

A second aspect includes a system having: at least one computing device configured to: modify an integrated circuit (IC) design structure including a silicon-based optical waveguide structure; and prepare manufacturing data for formation of the IC design structure in a computer-implemented IC formation system, wherein the preparing of the manufacturing data includes: adjusting the IC design structure to form at least one curved shape; and inserting instructions into the manufacturing data to convert at least one shape from a <110> crystallographic direction to a <100> crystallographic direction.

A third aspect includes a computer program product having program code stored on a computer-readable storage medium, which when executed by at least one computing device, causes the at least one computing device to perform: modifying an integrated circuit (IC) design structure including a silicon-based optical waveguide structure; and preparing manufacturing data for formation of the IC design structure in a computer-implemented IC formation system, wherein the preparing of the manufacturing data includes: adjusting the IC design structure to form at least one curved shape; and inserting instructions into the manufacturing data to convert at least one shape from a <110> crystallographic direction to a <100> crystallographic direction.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As noted, the subject matter disclosed herein relates to integrated circuits. More particularly, the subject matter relates to silicon-based optical waveguide chips on bulk Si substrates, and methods of designing and forming such chips.

As described herein, due to increased complexity and functionality of devices relying upon integrated circuits (ICs), those devices have required ever more dynamic ICs to meet the demands of those device users. For example, as mobile telephone technology has advanced, the size of the mobile phone has been significantly reduced while its functionality has significantly increased. These changes have required greater versatility from the ICs in mobile phones, as well as in other devices. In the case of the mobile phone, advances in these devices have required use of a single antenna as both a transmitter and receiver. The circuitry used in these antenna devices must therefore be able to switch very quickly in order to provide reliable performance. Silicon-on-insulator (SOI) substrates have been used to build circuits capable of switching at these fast speeds. However, SOI substrates can be expensive to procure, making them less practicable for use.

Various embodiments include systems, methods and computer-program products for forming silicon-based optical waveguide structures. Various particular embodiments include modifying a data-preparation process in forming a silicon-based optical waveguide structure in order to convert a directionality of the edges of the waveguide by approximately forty-five (45) degrees in order to enhance the efficiency of that waveguide.

According to some embodiments, a silicon-based optical waveguide structure includes: a bulk silicon substrate; a set of waveguide structures positioned within the bulk silicon substrate, wherein each of the set of waveguide structures includes: a silicon dioxide (SiO2) layer filling a cavity within the bulk silicon substrate; a silicon germanium (SiGe) layer directly over the SiO2 layer, the silicon germanium layer having a substantially flat lower surface contacting the SiO2 layer; and a silicon layer overlying the SiGe layer, wherein the SiO2 layer extends above the SiGe layer through the silicon layer.

According to various embodiments, a computer-implemented method includes: modifying an integrated circuit (IC) design structure including a silicon-based optical waveguide structure; and preparing manufacturing data for formation of the IC design structure in a computer-implemented IC formation system, wherein the preparing of the manufacturing data includes: adjusting the IC design structure to form at least one curved shape; and inserting instructions into the manufacturing data to convert at least one shape from a <110> crystallographic direction to a <100> crystallographic direction.

Various additional embodiments include a system having: at least one computing device configured to: modify an integrated circuit (IC) design structure including a silicon-based optical waveguide structure; and prepare manufacturing data for formation of the IC design structure in a computer-implemented IC formation system, wherein the preparing of the manufacturing data includes: adjusting the IC design structure to form at least one curved shape; and inserting instructions into the manufacturing data to convert at least one shape from a <110> crystallographic direction (alignment) to a <100> crystallographic direction (alignment).

Various other embodiments include: a computer program product having program code stored on a computer-readable storage medium, which when executed by at least one computing device, causes the at least one computing device to perform: modifying an integrated circuit (IC) design structure including a silicon-based optical waveguide structure; and preparing manufacturing data for formation of the IC design structure in a computer-implemented IC formation system, wherein the preparing of the manufacturing data includes: adjusting the IC design structure to form at least one curved shape; and inserting instructions into the manufacturing data to convert at least one shape from a <110> crystallographic direction to a <100> crystallographic direction.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

It is known in the art to insert features that are electrically inactive ("fill structures") into a layout to increase layout pattern density or and to remove features from the layout ("cheese structures") to decrease layout pattern density. Fill and cheese structures are conventionally created during "dataprep", just prior to generating the masks for the integrated circuits.

Figure 1:
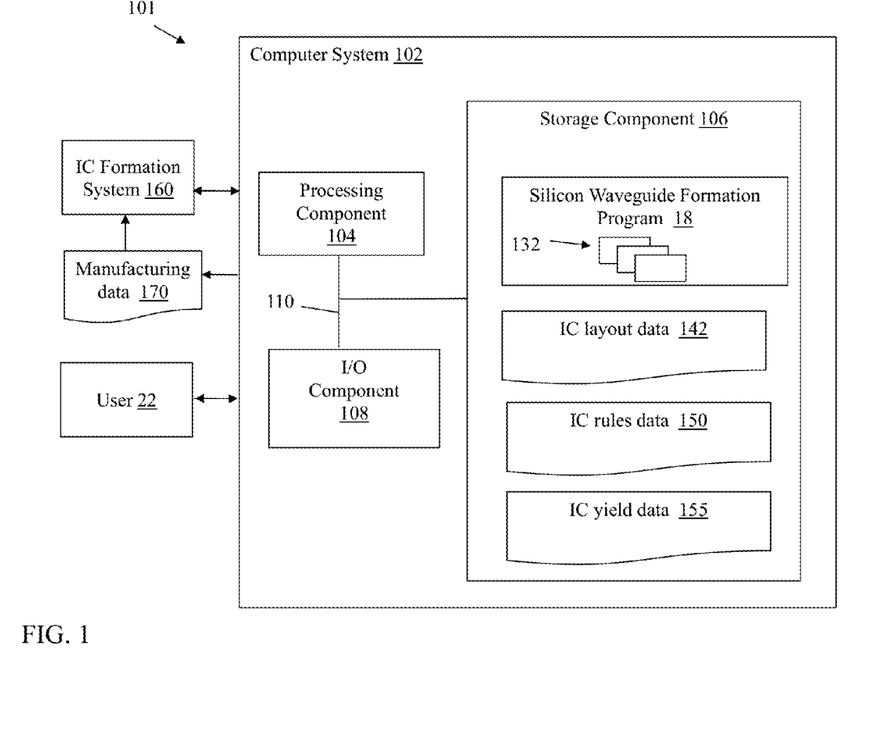
FIG. 1 shows a schematic environment for implementing a silicon waveguide formation program according to various embodiments.

Turning to the drawings, FIG. 1 depicts an illustrative environment 101 for verifying an IC layout according to embodiments. To this extent, the environment 101 includes a computer system 102 that can perform a process described herein in order to verify an IC layout. In particular, the computer system 102 is shown as including a silicon waveguide formation program 18, which makes computer system 102 operable to provide instructions for forming a silicon waveguide by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the silicon waveguide formation program 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user (e.g., a human or other user) 22 and/or a computer system for forming integrated circuits (e.g., IC formation system 160) to interact with the computer system 102 and/or one or more communications devices to enable a system user 22 and/or IC formation system 160 to communicate with the computer system 102 using any type of communications link. To this extent, the silicon waveguide formation program 18 can manage a set of interfaces (e.g., graphical user interface(s), application program interface, etc.) that enable human and/or system users 22 and/or IC formation system 160 to interact with the silicon waveguide formation program 18. Further, the silicon waveguide formation program 18 can manage (e.g., store, retrieve, create, manipulate, organize, present, etc.) data, such as IC layout data and/or IC rules data (including wafer and chip-level rules data such as mask rule checking (MRC) data) using any solution.

In various embodiments, the IC formation system 160 includes a fabrication system including at least one computing device for executing instructions (e.g., manufacturing data 160) provided by the silicon waveguide formation program 18 to form a silicon-based optical waveguide structure according to the various embodiments described herein. According to various embodiments, the IC formation system 160 and the silicon waveguide formation program 18 can each include components physically housed within the same computer system (e.g., computer system 102), however, in other embodiments, the IC formation system 160 and the silicon waveguide formation program 18 may be separate components/systems. According to various embodiments, the manufacturing data 160 can include instructions in one or more conventional program languages used to instruct a fabrication system in forming an integrated circuit structure.

In any event, the computer system 102 can comprise one or more general purpose computing articles of manufacture (e.g., computing devices) capable of executing program code, such as the silicon waveguide formation program 18, installed thereon. As used herein, it is understood that "program code" means any collection of instructions or algorithms, in any language, code or notation, that cause a computing device having an information processing capability to perform a particular function either directly or after any combination of the following: (a) conversion to another language, code or notation; (b) reproduction in a different material form; and/or (c) decompression. To this extent, the silicon waveguide formation program 18 can be embodied as any combination of system software and/or application software.

Further, the silicon waveguide formation program 18 can be implemented using a set of modules 132. In this case, a module 132 can enable the computer system 102 to perform a set of tasks used by the silicon waveguide formation program 18, and can be separately developed and/or implemented apart from other portions of the silicon waveguide formation program 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of silicon waveguide formation program 18 fixed thereon (e.g., one or more modules 132). However, it is understood that the computer system 102 and silicon waveguide formation program 18 are only representative of various possible equivalent computer systems that may perform a process described herein. To this extent, in other embodiments, the functionality provided by the computer system 102 and silicon waveguide formation program 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as IC layout data 142, IC rules data 150 and/or IC yield data 155 using any solution. For example, the computer system 102 can generate and/or be used to retrieve IC layout data 142, IC rules data 150 and/or IC yield data 155 from one or more data stores, receive IC layout data 142, IC rules data 150 and/or IC yield data 155 from another system, send IC layout data 142, IC rules data 150 and/or IC yield data 155 to another system, etc. IC layout data 142 can include data about a layout of an IC, including design parameters such as spacings, tolerances, dimensions (e.g., line widths), intended current levels, etc., IC rules data 150 can include data about masking (e.g., photolithography masking and/or etching) rules for forming components in an IC design based upon exposure, dose, etc., and IC yield data 155 can include data such as predicted and/or actual yield data about one or more production processes in the formation of the IC (including chip-level, wafer-level, and/or wafer-level data) or a component of the IC (e.g., one or more chip packages).

While shown and described herein as methods, systems, and computer program products for providing instructions for forming a silicon waveguide structure, it is understood that aspects of the invention further provide various alternative embodiments. For example, in one embodiment, the invention provides a computer program fixed in at least one computer-readable medium, which when executed, enables a computer system to provide instructions for forming a silicon waveguide structure. To this extent, the computer-readable medium includes program code, such as the silicon waveguide formation program 18 (FIG. 1), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the silicon waveguide formation program 18 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for verifying an IC layout using net-voltage based calculations. In this case, a computer system, such as the computer system 102 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

It is understood that aspects of the invention can be implemented as part of a business method that performs a process described herein on a subscription, advertising, and/or fee basis. That is, a service provider could offer to generate a scatterometry library as described herein. In this case, the service provider can manage (e.g., create, maintain, support, etc.) a computer system, such as computer system 102 (FIG. 1), that performs a process described herein for one or more customers. In return, the service provider can receive payment from the customer(s) under a subscription and/or fee agreement, receive payment from the sale of advertising to one or more third parties, and/or the like.

Figure 2:
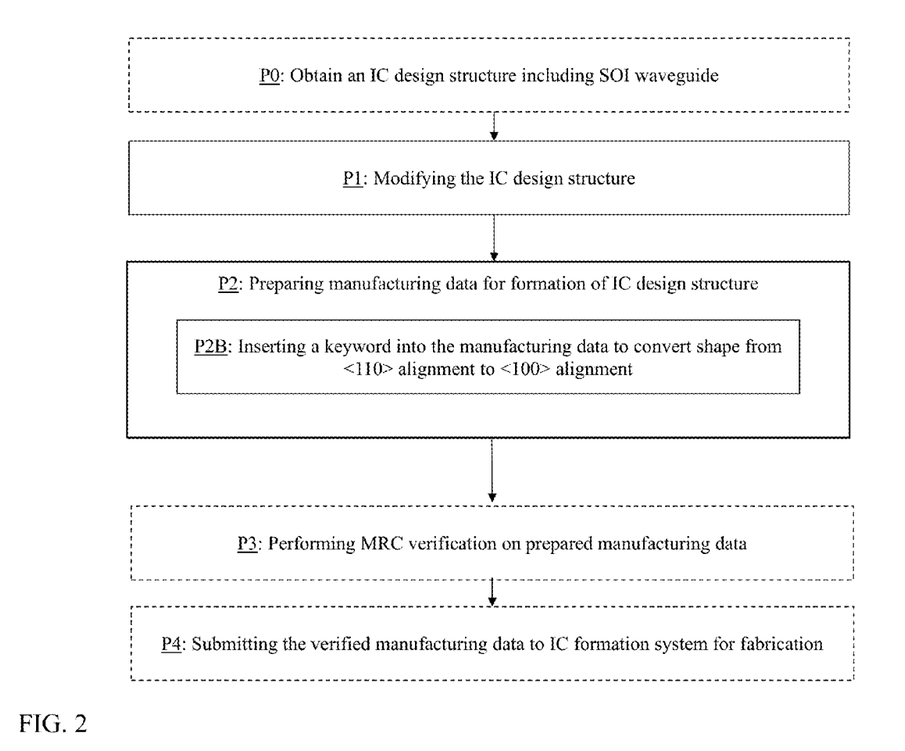
FIG. 2 shows a flow diagram depicting processes according to various embodiments.

FIG. 2 is an illustrative flow diagram depicting processes performed according to various embodiments. It is understood that various processes are depicted as optional pre and/or post-processes that may be performed in accordance with the various embodiments described herein. However, it is understood that processes depicted with dashed outlines (e.g., dashed boxes or other polygons) may be optional processes. The method can include the following processes:

Process P0 (optional pre-process): obtain an integrated circuit (IC) design structure (e.g., including IC layout data 142) that includes a silicon-based optical waveguide structure. In some cases, the IC design structure can be obtained as a data file (e.g., IC layout data 142) from one or more data stores, layout design programs, etc., known in the art.

Process P1: modifying the integrated circuit (IC) design structure including a silicon-based optical waveguide structure. In various embodiments, the modifying process can include introducing at least one fill structure, and removing at least one cheese structure, from the silicon-based optical waveguide structure. This process of "cheesing" and "filling" can be performed according to various embodiments known in the art, and as is known in the art, due to the nature of fill structures and cheese structures as electrically inactive structures, these elements may be introduced/removed from the silicon-based optical waveguide structure, for example, to enhance manufacturability of that silicon-based optical waveguide structure.

Figures 3A, 3B:
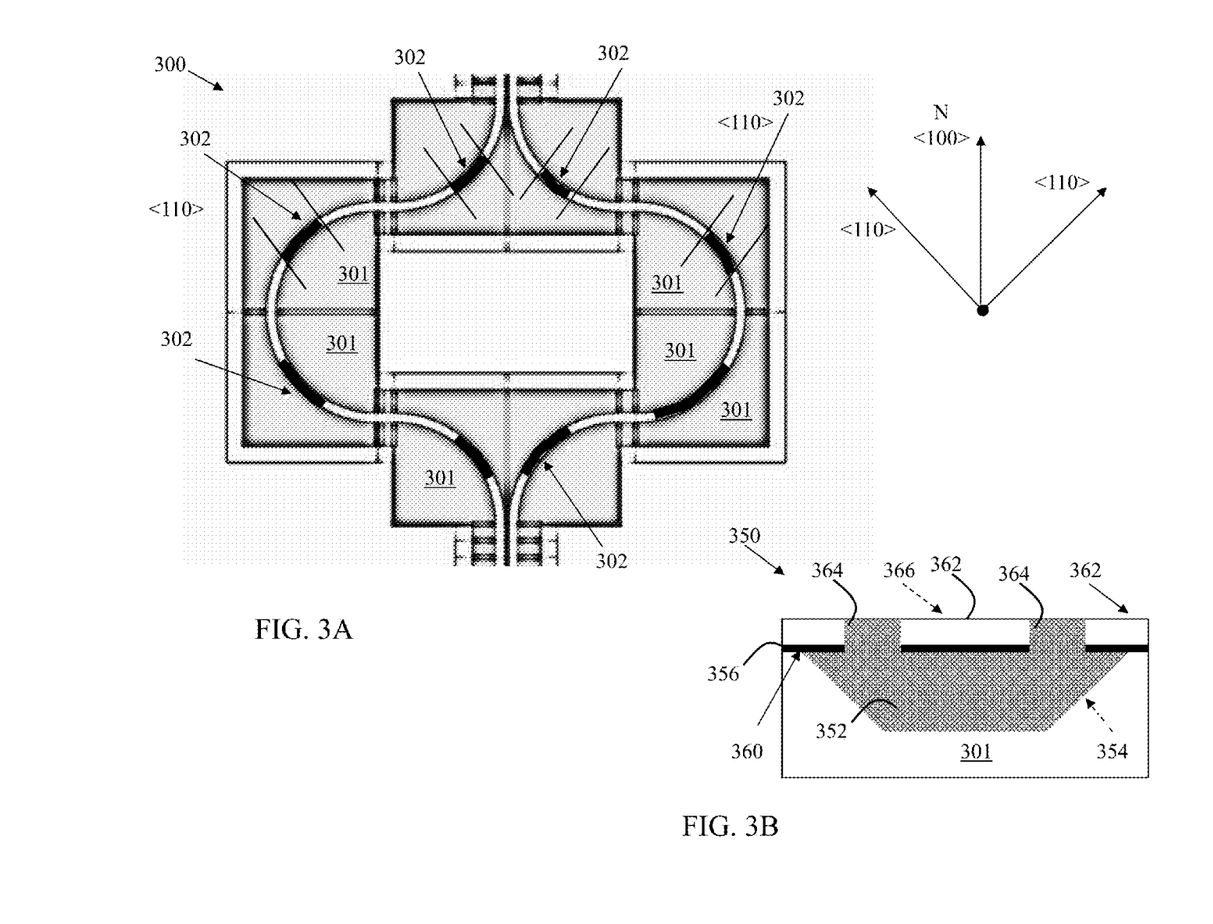
FIG. 3A shows top-down depiction of an example silicon waveguide structure according to various embodiments.
FIG. 3B shows a side cross-sectional depiction of a section of the silicon waveguide structure of FIG. 3B according to various embodiments.

Process P2 (following process P1): preparing manufacturing data for formation of the IC design structure in a computer-implemented IC formation system (e.g., IC formation system 160). According to various embodiments, preparing manufacturing data (Process P1) includes a sub-process:

Process P2A: inserting instructions into the manufacturing data 170 to convert at least one shape from a <110> crystallographic direction to a <100> crystallographic direction. It is understood that a <110> crystallographic direction as used herein is parallel to the normal axis N, and is off-set from the crystal direction of the silicon substrate in the silicon-based optical waveguide structures described herein by 45 degrees. FIG. 3A shows a top-down view of an example silicon-based optical waveguide structure 300 including a shape 302 that is converted from a <110> crystallographic direction to a <100> crystallographic direction. The <100> crystallographic direction is off-set from the direction of the <110> crystallographic direction by 45 degrees, and is perpendicular to the crystal direction of the silicon substrate 301 in the silicon-based optical waveguide structure 300. This shape 302 was originally a right-angled edge, including a section parallel to the normal axis N connected and continuous with a section perpendicular to the normal axis N. In any case, according to various embodiments, the silicon waveguide formation program 18 can insert one or more keywords into the manufacturing data 170 for formation of the silicon-based optical waveguide structure (e.g., silicon-based optical waveguide structure 300) to convert the shape <110> crystallographic direction to the <100> crystallographic direction. In particular, the keyword(s) in the manufacturing data 170 can include at least one of a photolithography assist feature or an etch assist feature that converts the at least one shape from the <110> crystallographic direction to the <100> crystallographic direction.

FIG. 3B shows a close-up cross-sectional view of a portion of an individual waveguide 350 formed within the silicon substrate 301 of the silicon-based optical waveguide structure 300. It is understood that according to various embodiments, one or more of the shapes 302 can include a waveguide 350, such that the silicon-based optical waveguide structure 300 includes a set (e.g., plurality) of waveguides 350. As noted herein, some waveguides 350 can be configured to have arbitrary shapes (e.g., in the arbitrary manner of the shapes 302), such that adjacent waveguides 350 can have distinct physical characteristics.

In any case, each of the set of waveguides 350 can include a silicon dioxide ($SiO_2$) layer 352 filling a cavity 354 (shown in phantom) within the (bulk) silicon substrate 301. Each set of waveguides 350 can also include an intermediate layer (e.g., silicon germanium (SiGe), or in some cases, silicon) layer 356 directly over the $SiO_2$ layer 352. According to various embodiments, the intermediate (e.g., SiGe or silicon) layer 356 has a substantially flat (flat or nominally modified from flat) lower surface 360 contacting the $SiO_2$ layer 352. This flat lower surface 360 is formed by a selective undercut etch of the silicon 301 when forming the cavity 354, such that the selective undercut etch of the silicon 301 does not etch the intermediate (e.g., SiGe or silicon) layer 356. The $SiO_2$ layer 352 is formed after the cavity 354, and contacts the substantially flat lower surface 360. Overlying the intermediate (e.g., SiGe or silicon) layer 356 is a silicon layer 362, which may be part of the silicon substrate 301. As shown, portions 364 of the $SiO_2$ layer extend above the intermediate (e.g., SiGe or silicon) layer 356 through the silicon layer 362.

According to various embodiments, the silicon layer 362 is located between the portions 364 of the $SiO_2$ layer, and in some cases, the silicon layer 362 includes a non-uniform thickness region 366 (shown in phantom), where the thickness of the silicon layer 362 is substantially non-uniform, that is, it includes topographical differences (e.g., one or more ribs or protrusions) on its upper surface. In various embodiments, adjacent waveguides 350 in the silicon-based optical waveguide structure 300 can have distinct configurations in the silicon layer 362, such that one waveguide 350 can include the non-uniform thickness region 366, while an adjacent waveguide 350 (e.g., in an adjacent shape 302) can include a silicon layer 362 that does not include the non-uniform thickness region 366.

Figure 4:
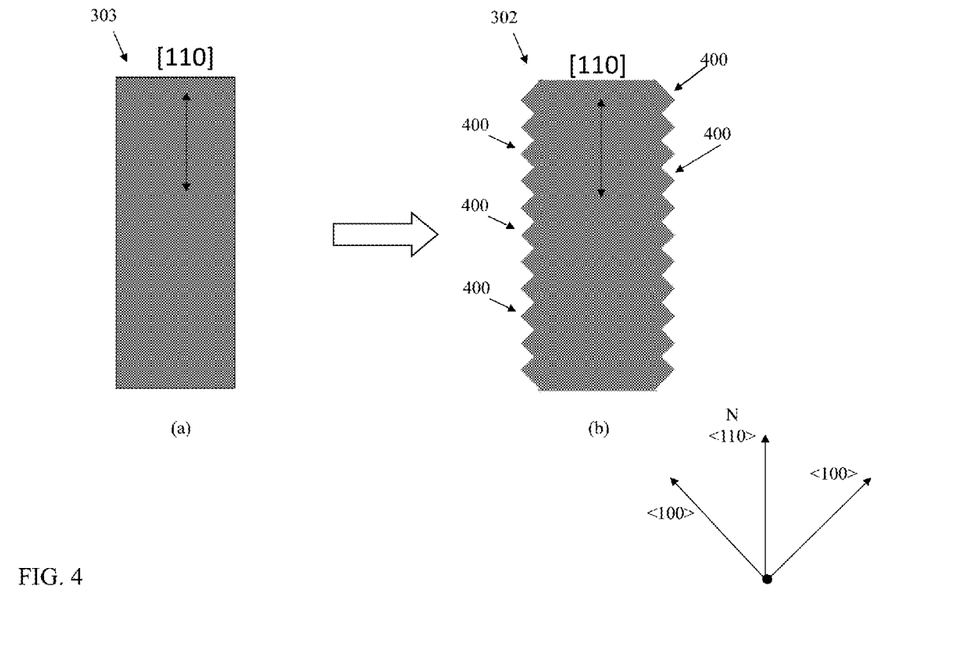
FIG. 4 shows an example schematic depiction of assist features used to modify a silicon waveguide structure according to various embodiments.

FIG. 4 shows an example of a portion of a shape 303 in the silicon-based optical waveguide structure 300, in (a): prior to adding assist feature(s); and in (b): after adding assist features 400 in the <100> direction to form shape 302. The assist features 400 (photolithography and/or etch) can convert the shape 303 from a <110> crystallographic direction to a <100> crystallographic direction as in shape 302 (as shown in waveguide structure 300). In this case, the assist features 400 include saw-toothed edges added to shape 303, where the saw-toothed edges have an crystallographic direction at <100>. In this example, all sections having a <110> edge are modified to have trenches accessing the silicon substrate with <100> edges.

Figure 5:
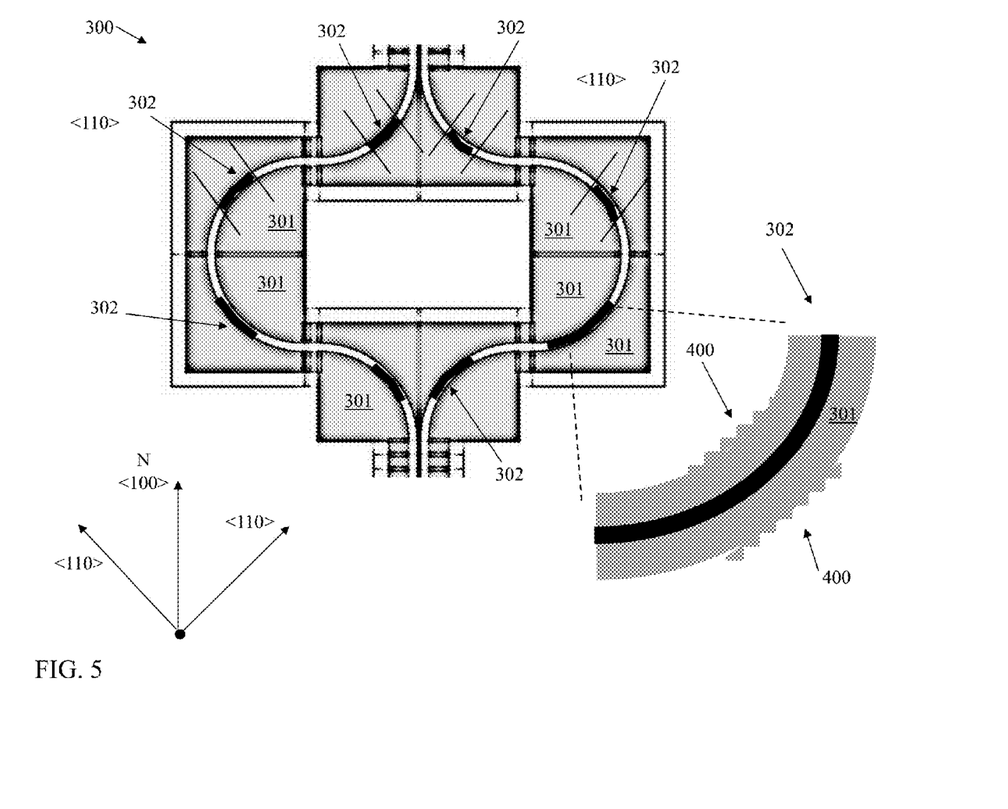
FIG. 5 illustrates a close-up view of a section of the silicon waveguide structure of FIG. 3A.

FIG. 5 shows a close-up view of a portion of the shape 302 in waveguide structure 300 (FIG. 3A), the principle of which is also shown in FIG. 4. As shown, the section of shape 302 in the close-up view has assist features 400 with saw-toothed edges. In this case, all edges within 20 degrees of <110> are modified to form trenches with a <100> crystallographic direction in the substrate <100>.

Process P3 (optional post-process): following process P2, process P3 can include performing a mask rule checking (MRC) verification process on the prepared manufacturing data 170, using convention MRC verification methods and the IC rules data 150 (and potentially, IC yield data 155). As is known in the art, MRC can include verifying that the manufacturing data (which includes instructions for forming the layout as specified in the IC layout data 142) will yield an IC without violating one or more masking rules in the IC rules data 150. This IC rules data 150 can include parameters such as exposure, dose, intensity, etc., that must not be violated in order to provide yields that meet defined criteria. For example, MRC can include verifying that a mask shape is large enough, and spaced sufficiently enough from adjacent mask shapes, to prevent diffracted light from interfering with those other shapes (either simultaneously or later-formed) during one or more photolithography processes.

Process P4 (optional post-process): following process P3, process P4 can include submitting the verified prepared manufacturing data 170 (or a modified version of such data, based upon MRC) to the computer-implemented IC formation system 160 for fabrication of the IC design structure. As noted herein, where the IC formation system 160 is located remotely (physically separated) from the silicon waveguide formation program 18 and computer system 102, the manufacturing data 170 may be transmitted via any conventional data transmission medium/media known in the art.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A silicon-based optical waveguide structure comprising:
    a bulk silicon substrate;
    a set of waveguide structures positioned within the bulk silicon substrate, wherein each of the set of waveguide structures includes:
        a silicon dioxide ($SiO_2$) layer filling a cavity within the bulk silicon substrate;
        an intermediate layer directly over the $SiO_2$ layer, the intermediate layer having a substantially flat lower surface contacting the $SiO_2$ layer; and
        a silicon layer overlying the intermediate layer,
        wherein the $SiO_2$ layer extends above the intermediate layer through the silicon layer.

2. The silicon-based optical waveguide structure of claim 1, wherein the set of waveguide structures includes a plurality of waveguide structures.

3. The silicon-based optical waveguide structure of claim 2, wherein one of the plurality of waveguide structures includes a non-uniform thickness region in the silicon layer overlying the intermediate layer.

4. The silicon-based optical waveguide structure of claim 3, wherein the non-uniform thickness region includes a topographical difference in the silicon layer.

5. The silicon-based optical waveguide structure of claim 3, wherein the non-uniform thickness region in the silicon layer is located between sections of the $SiO_2$ layer extending through the silicon layer.

6. The silicon-based optical waveguide structure of claim 3, wherein a second one of the plurality of waveguide structures does not include a non-uniform thickness region in the silicon layer overlying the intermediate layer.

7. The silicon-based optical waveguide structure of claim 6, wherein the second one of the plurality of waveguide structures is adjacent the first one of the plurality of waveguide structures.

8. The silicon-based optical waveguide structure of claim 3, wherein the intermediate layer separates the $SiO_2$ in the cavity from the non-uniform thickness region.

9. The silicon-based optical waveguide structure of claim 1, wherein the intermediate layer includes silicon.

10. The silicon-based optical waveguide structure of claim 1, wherein the intermediate layer includes silicon germanium (SiGe).

11. The silicon-based optical waveguide structure of claim 1, wherein the silicon layer is located between portions of the $SiO_2$ layer.

12. The silicon-based optical waveguide structure of claim 4, wherein the topographical difference includes at least one rib or protrusion.

13. A silicon-based optical waveguide structure comprising:
    a bulk silicon substrate;
    a set of waveguide structures positioned within the bulk silicon substrate, wherein each of the set of waveguide structures includes:
        a silicon dioxide ($SiO_2$) layer filling a cavity within the bulk silicon substrate;
        an intermediate layer directly over the $SiO_2$ layer, the intermediate layer having a substantially flat lower surface contacting the $SiO_2$ layer; and
        a silicon layer overlying the intermediate layer,
        wherein the $SiO_2$ layer extends above the intermediate layer through the silicon layer,
    wherein the set of waveguide structures includes a plurality of waveguide structures, wherein one of the plurality of waveguide structures includes a non-uniform thickness region in the silicon layer overlying the intermediate layer,
    wherein a second one of the plurality of waveguide structures does not include a non-uniform thickness region in the silicon layer overlying the intermediate layer.

14. The silicon-based optical waveguide structure of claim 13, wherein the non-uniform thickness region includes a topographical difference in the silicon layer.

15. The silicon-based optical waveguide structure of claim 13, wherein the non-uniform thickness region in the silicon layer is located between sections of the $SiO_2$ layer extending through the silicon layer.

16. The silicon-based optical waveguide structure of claim 13, wherein the second one of the plurality of waveguide structures is adjacent the first one of the plurality of waveguide structures.

17. The silicon-based optical waveguide structure of claim 13, wherein the intermediate layer separates the $SiO_2$ in the cavity from the non-uniform thickness region.

18. The silicon-based optical waveguide structure of claim 13, wherein the intermediate layer includes silicon.

19. The silicon-based optical waveguide structure of claim 13, wherein the intermediate layer includes silicon germanium (SiGe).

* * * * *